United States Patent [19]

United States Patent [19]

Armeniades

[11] Patent Number: 4,931,490
[45] Date of Patent: Jun. 5, 1990

[54] EXPANDABLE POLYMER CONCRETES AND MORTARS UTILIZING LOW CURE TEMPERATURE POLYMERS

[76] Inventor: C. D. Armeniades, P.O. Box 1892, Houston, Tex. 77251

[21] Appl. No.: 281,019

[22] Filed: Dec. 7, 1988

Related U.S. Application Data

[63] Continuation-in-part of Ser. No. 198,620, May 20, 1988, which is a continuation of Ser. No. 728,837, Apr. 30, 1985, abandoned, which is a continuation of Ser. No. 538,925, Oct. 4, 1983, abandoned.

[51] Int. Cl.$^5$ .................................................. C08J 9/32
[52] U.S. Cl. .................................... 523/218; 521/83; 521/91; 521/92; 521/94; 521/138; 521/149; 521/178; 523/219; 106/122
[58] Field of Search ............... 523/218, 219; 521/83, 521/91, 92, 94, 138, 178, 149

[56] References Cited

U.S. PATENT DOCUMENTS

| | | | |
|---|---|---|---|
| 2,514,141 | 7/1950 | Phillips | 521/138 |
| 2,860,061 | 11/1958 | Heilmann . | |
| 3,014,530 | 12/1961 | Harvey et al. . | |
| 3,126,959 | 3/1964 | Ortloff . | |
| 3,373,814 | 3/1968 | Eilers et al. . | |
| 3,420,299 | 1/1969 | Cloud . | |
| 3,421,584 | 1/1969 | Eilers et al. . | |
| 3,447,608 | 6/1969 | Fry et al. . | |
| 3,599,435 | 8/1971 | Kolb . | |
| 3,613,790 | 10/1971 | Stout et al. . | |
| 3,878,686 | 4/1975 | Hageman . | |
| 4,167,611 | 9/1979 | Czarnecki et al. . | |
| 4,204,988 | 5/1980 | Crouzet . | |
| 4,222,929 | 9/1980 | Shanoski et al. . | |
| 4,226,911 | 10/1980 | Havin . | |
| 4,275,788 | 6/1981 | Sweatman . | |
| 4,315,703 | 2/1982 | Gasper . | |
| 4,322,334 | 3/1982 | Arakawa et al. . | |
| 4,336,181 | 6/1982 | Iseler et al. . | |
| 4,346,050 | 8/1982 | Trent et al. . | |
| 4,389,320 | 6/1983 | Clampitt . | |

FOREIGN PATENT DOCUMENTS 1341244 9/1963 France .
1466027 3/1977 United Kingdom .

OTHER PUBLICATIONS

"Expansive Resin Concrete: Some Fundamental Questions", Czarnecki, Proceedings, 3d Int'l Cong. on Polymers in Concrete.
Montmorillonite Polymer Concrete: Zero-Shrinkage and Expanding Polymer Concrete with Enhanced Strength, Haque et al., 26 Polymer Engr. & Science, 1524–29, Nov. 1986.
Montmorillonite Polymer Concrete: Zero-Shrinkage and Expanding Polymer Concrete with Enhanced Strength, Haque et al., ANTEC, 1239–42, 1985.
Interaction of Montmorillonite with Resins to Produce Cure-Expanding High-Strength Polymer Concrete Systems, Haque et al., ANTEC, 1296–98, 1986.
The Influence of the Constituent Minerals and of the Forming Process on the Burning Behaviors of Nodules, Hill et al., Chem. Abstracts, vol. 52, p. 15014E.
Structure Formation in the Aqueous Palygorskite-Cement System, Ovcharenko et al., Chem. Abstracts, vol. 65, 1966, p. 19820.

(List continued on next page.)

*Primary Examiner*—Morton Foelak
*Attorney, Agent, or Firm*—Pravel, Gambrell, Hewitt, Kimball & Krieger

[57] ABSTRACT

An expandable polymer concrete or mortar composition, and process for producing it, which allows the use of low temperature cure resins by incorporating a substituted mineral which is able to expand in the polymer concrete mix so that the dilation of the mineral will counteract the shrinking effect of the curing resin. The substituted mineral may be selected from the montmorillonite group and is produced by substituting its water of hydration with a higher volatility composition such as ammonia.

20 Claims, 1 Drawing Sheet

OTHER PUBLICATIONS

"Cure Shrinkage Control with Strength Enhancement in Polymer Concrete by Combining Polymerization with Mineral Dehydration: Montmorillonite Polymer Concrete, " The Production Performance & Potential of Polymers in Concrete, Chap. 7, pp. 187–191, Int'l Cong. on Polymers in Concrete, 1987, Armeniades et al.

Role of Metastable Phases in Silicate Formation Processes, Mchedlov–Petrosyan, Chem. Abstracts, vol. 84, 1976, p. 78702J.

Additive for Cement Mixtures, Wallace & Co., Chem. Abstract, vol. 65, 1966, p. 11961.

Study of the Process of the Production of Expanded Agglomerate by a Method of Rapid Thermoanalysis with Simultaneous Determination of the Electrical Conductivity, Budnikov et al., Chem. Abstracts, vol. 55, p. 20379.

Low–Shrinkage, Shrinkage–Free, and Expanding Polymer Concrete Containing FA Monomer, Putlyaev, Chem. Abstracts, 30194 K., vol. 80, 1974, p. 212.

Polymer–Concrete Mixture, Irtuganova et al., Chem. Abstracts, 95730, vol. 81, 1974, p. 277.

Anhydrous Minerals and Organic Materials as Sources of Distress in Concrete, Hansen, Chem. Abstracts, vol. 64, 1966, p. 429.

EXPANDABLE POLYMER CONCRETES AND MORTARS UTILIZING LOW CURE TEMPERATURE POLYMERS

CROSS-REFERENCE TO RELATED APPLICATION

This application is a continuation-in-part of U.S. Ser. No. 198,620 filed May 20, 1988 and copending herewith, which application was a continuation of U.S. Ser. No. 728,837 filed Apr. 30, 1985, abandoned, which in turn was a continuation of U.S. Ser. No. 538,925 filed Oct. 4, 1983, abandoned.

FIELD OF INVENTION

This invention relates to improved polymer-based concretes and mortars (PCs) in which cure-shrinkage is controlled so that they show zero shrinkage or undergo controlled expansion upon hardening. The improvement over similar compositions of co-pending U.S. Ser. No. 198,620 permits the use of expandable mineral additives with thermosetting resin compositions that may not be cured at temperatures above about 100° C. due to their volatility. The invention, which is useful for resins which cure at ambient temperatures, expands the range of monomers and resins that may now be used in zero-shrinkage PCs and also expands the range of uses for said PCs. The invention PCs when suitably formulated have a wide field of application, ranging from repairs of buildings and other structures, to dental restoration materials because the inventive PCs flow readily into crevices, cure at ambient temperatures and expand controllably to provide a tight, hard seal. Moreover, the inventive PCs are ideal for use in delicate structural restorative work such as the restoration of antiques. The prior art PCs, due to their propensity to shrink, have often caused delicate artifacts to wrinkle or collapse. A PC according to this invention may be applied to the artifact and cured at ambient temperature while maintaining a constant volume so that the artifact is preserved without risk of distortion or damage.

BACKGROUND OF THE INVENTION

Ordinary concrete consists of mineral aggregate (sand and gravel) bound together with Portland Cement, the latter hardening by reacting chemically with water to form a hydrated solid matrix integral with the aggregate. Polymer concrete also contains mineral aggregate and fillers but uses instead of Portland Cement various organic resins, which polymerize to bind the aggregate and form a solid matrix. The term "polymer concrete" as used here as well as in the technical literature does not include polymer-extended, ordinary concretes. The latter are aqueous systems, containing water-soluble resins or latexes, usually in conjunction with Portland Cement.

In contrast, polymer concretes do not ordinarily contain free water in their formulation. (See "Polymers in Concrete": Proceedings of the Second International Congress, Oct. 25-27, 1978, pages 1-4, University of Texas at Austin, 1978.) Hardening of polymer concrete generally involves organic reactions (polymerization, cross-linking) which solidify the resin and bind it to the aggregate and filler. These reactions are triggered by heat or by special chemical agents which are added to the resin. The overall process is termed "curing" or "setting". The advantages of polymer concrete include fast curing rates, much higher strengths than ordinary concrete and impermeability to water. While the above properties are important in determining areas of application of polymer concrete, this invention focuses on other properties: the dimensional changes (shrinkage or expansion) of the polymer concrete system as it hardens.

Polymer concretes and mortars have an inherent tendency to shrink as they cure. This is due to the polymerization and cross-linking reactions, which increase the density of the hardening resin. For example, polymerization of methylmethacrylate produces a shrinkage of up to 23%; polymerization and cross-linking of unsaturated polyester-styrene systems, a shrinkage of 8-12%.

In PCs prepared in accordance with prior art, the cure shrinkage of the overall systems is maintained at levels of 2% or less by the use of large amounts of inert fillers and aggregate (as high as 90% by weight of the total system). However, the concentration of shrinkage in the polymer matrix of these systems creates substantial local stresses, "setting stresses," which reduce the strength of the cured composite.

It is important to distinguish between cure shrinkage and setting stresses in polymer concrete. Both are due to shrinkage forces, generated during the polymerization or cross-linking of the resin, when hitherto secondary chemical bonds between organic molecules are transformed to primary (covalent) bonds which have much smaller interatomic distances. In polymerization systems, containing little or no mineral filler, these forces are accommodated by a volume reduction in the still-fluid resin during the pre-gel part of the cure; this would constitute the cure shrinkage. In PCs, however, where the particles of the filler and aggregate occupy about 70-75% of the total volume, these solid particles are nearly close packed. The liquid resin is mostly confined to the small spaces between particles which cannot change in volume. In these confined spaces the cure shrinkage forces are not relieved and give rise to local tensile stresses which increase progressively as the system hardens with cure. These are the setting stresses.

Both cure shrinkage and setting stresses are highly undesirable. Excessive shrinkage during cure tends to impair moldability, dimensional stability, and the appearance of the product. Setting stresses reduce the ultimate strength and significantly impair the creep resistance of polymer concrete. Severe shrinkage stresses can cause cracking in the polymer to a degree which may result in failure of the concrete structure.

The parent of this application, U.S. Ser. No. 198,620, discloses the use of small quantities of an expandable hydrated mineral additive in PCs to control cure shrinkage and eliminate setting stresses. Indeed, when added in sufficient quantity, these minerals produce an expandable PC. The minerals useful as additives to control cure shrinkage include those minerals having between about 10-25% of releasable water of hydration within their crystal lattices such as the montmorillonite group of minerals: montmorillonite (MMT), beidellite, montronite, saponite and hectorite.

These minerals may be used with most thermosetting polymer systems known in the art provided that the PC systems are formulated and processed so as to attain an internal temperature of 100° C. or greater during the curing stage. The MMT, or similar mineral, is dispersed within the thermosetting resin in the form of fine particles and is coupled to the resin with small amounts of organo-silanes or similar coupling agents. When these compositions are cured at oven temperatures of about 60°-80° C., the polymerization exotherm raises the internal temperature of the curing system to about 120°-140° C. thereby releasing some of the hydration water from the MMT crystals in vapor form. However, the MMT particles containing these hydrated crystals are imbedded in and bound to the resin which at this point has polymerized to a highly viscous state. This encapulation of the MMT particles in viscous resin confines the generated water vapor within the MMT particles, causing these particles to swell to 3-4 times their original size. This swelling counteracts the cure shrinkage of the resin and minimizes setting stresses in the cured system without generating low-strength domains (such as bubbles) which would appear if the vapor were to escape from the MMT particles. The binding of MMT to the resin via silane coupling agents further enhances the integrity of the system. The end result is a most advantageous combination of cure shrinkage control (from zero shrinkage to a net expansion of a few percent) as well as strength enhancement of the cured polymer composite.

While the expandable PC of U.S. Ser. No. 198,620 presents an advance over the prior art, it requires that the internal temperature of the polymerizing system exceed 100° C. during cure in order to trigger MMT dehydration. This requirement limits application of the invention to oven-cured systems, thus precluding its use in large field-erected polymer concrete structures (which are cured at ambient temperatures) and severely curtailing its use with systems based on methyl methacrylate, a monomer that is too volatile to cure at 100° C.

The instant invention presents a significant advance: it overcomes this cure temperature limitation by replacing the hydration water of the naturally-occurring mineral additive, such as MMT with one or several polar liquids of high volatility such as ammonia, aliphatic amines, such as methylamine, dimethylamine, methylethylamine, alcohols, such as methanol, and ketones, such as acetone. Adding these substituted MMT's in suitable proportions to thermosetting resin systems makes possible the production at ambient cure temperatures of PCs having the cure shrinkage control and strength enhancement formerly achieved with the natural MMT only at cures above 100° C.

SUMMARY OF THE INVENTION

The invention allows the use of low cure temperature resins in the zero-shrinkage and expandable polymer concretes and mortars (PCs) of the parent application, U.S. Ser. No. 198,620 (hereinafter the "parent invention"). As a consequence, the instant invention expands the range of resins useable in these systems and also, by permitting cure at ambient temperatures, expands the range of potential applications for zero-shrinkage and expandable PCs.

In the parent invention, natural minerals such as those of the montmorillonite (MMT) group having 10-25% water of hydration are added to the PC mix in relatively small quantities to control cure shrinkage. This effect is the result of the expansion of the mineral particles dispersed into the resin, which occurs when some of the water of hydration is released in vapor form from the mineral crystals as a result of externally applied heat or the heat of reaction generated when the resin is cured. This vapor, however, cannot escape from the mineral particles, which are surrounded by a viscous, hardening mass of curing resin. The pressure generated by the trapped vapor forces the particles to expand, thereby counteracting the shrinkage of the resin during its curve. By judiciously selecting the quantity of mineral additive to add to any particular resin system, the extent of the expansion effect can be controlled. It is noteworthy, that to produce the expansion effect, the PC of the parent invention must generate (or be heated to) a sufficiently high temperature during cure to convert water of hydration in the dispersed mineral to vapor. Thus, the parent invention is limited to systems experiencing cure temperatures in excess of about 100° C.

The instant invention represents a significant advance over the basic parent invention in that it removes the temperature limitation. This is effected by using in place of the natural hydrated mineral additive (such as MMT) a modified mineral additive, in which the water of hydration has been partially or completely substituted by a composition of higher volatility. When this "substituted mineral" is used in the PC mix as an additive to control shrinkage, the cure temperature need only reach that temperature at which this higher volatility composition forms a vapor within the mineral particles. The mechanism for expansion of the mineral particles and consequent control of the overall PC volume during cure is understood to be substantially the same as for the parent invention.

BRIEF DESCRIPTION OF THE DRAWING

The sole drawing in this application.

DESCRIPTION OF THE PREFERRED EMBODIMENTS

Figure 1:
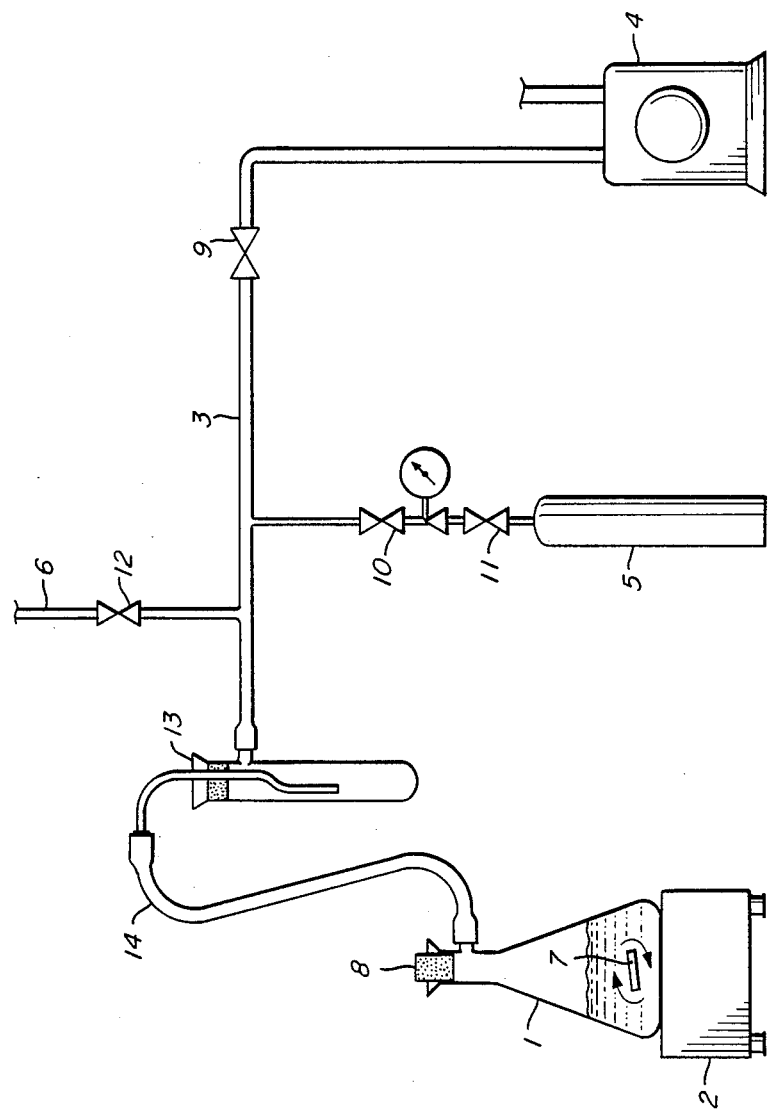
FIG. 1, is a schematic diagram of the apparatus used to produce the substituted mineral additive of the invention PCs.

The invention composition includes a monomer or resin, capable of polymerization, a substituted mineral additive for cure shrinkage control, particulate aggregate and/or fine filler, a coupling agent for binding the mineral particles to the resin system, and other compositions known in the art to be useful for curing resins such as polymerization initiators, cure promoters or retardants, and the like.

The monomers and resins useful in the PCs of this invention encompass all those resins typically used in the PC of the parent invention which include (but are not limited to) unsaturated-polyester/styrene systems, epoxy resins, vinyl esters, and modifications and combinations of the above monomers and prepolymers. However, the unique characteristic of the instant invention, that it produces an expandable PC when cured at ambient temperatures, is most useful with monomers and resins, which cannot be cured at 100° C. because of their volatility (such as methyl methacrylate and other acrylic resins) or in applications which preclude cure at elevated temperatures (such as dental restorative cements cured in the patient's mouth).

It is preferred, although not necessary, that a coupling agent suitable for binding the substituted mineral additive to the resin be added to the raw resin. A number of such coupling agents are known in the art. These include organosilanes (such as 3-methacryloxypropyl trimethoxysilane), titanates (alkoxy, chelated, and quaternary titanates), coordinate titanates, and zirconates. The particular coupling agent(s) for a given PC is selected on the basis of the chemistry of the organic resin and the mineral additive, aggregate, and fillers that must be bound in the overall system.

The substituted mineral additive may be produced from a range of naturally occurring hydrated minerals. These include those minerals which contain from about 10 to about 25% water of hydration. The smectite (montmorillonite) group is within this class of minerals and includes montmorillonite, beidellite, montronite, saponite and hectorite. While all of the montmorillonite group of minerals are useful to produce the substituted mineral component of the invention, the preferred mineral is montmorillonite (MMT).

To produce the substituted mineral additive, all or part of the water of hydration of the hydrated mineral additive is removed and replaced with a suitable composition having a higher volatility than water. These high volatility compositions include ammonia and aliphatic amines such as methylamine, dimethylamine, and methylethylamine; alcohols, such as methanol; and ketones, such as acetone. The preferred substitution compositions are ammonia and methylamine.

While there may be several methods for the substitution of the water of hydration with a suitable higher volatility composition, the apparatus for the preferred method is illustrated in FIG. 1. The apparatus consists of a flask 1 into which the powdered hydrated mineral is placed together with a magnetic stirring bar 7. The flask 1 is stoppered 8 and placed upon a heater supplied with a magnetic stirrer 2. The flask 1 is also connected via tubing 14 to a vacuum line trap 13, which is in turn connected with tubing 3 to a vent to atmosphere 6 via a vent valve 12; a source to pull a vacuum 4 via a vacuum valve 9; and a compressed ammonia ($NH_3$) cylinder 5 via a pressure regulator 11 and an $NH_3$ feed valve 10.

The process using this apparatus for the production of $NH_3$-MMT is explained in Example 1. This process includes heating a quantity of finely powdered MMT to between about 40° C. to about 60° C. while stirring and maintaining a pressure of about 100 mmHg to drive off the water of hydration. Once the temperature and pressure has stabilized, the powdered mineral is contacted with gaseous $NH_3$ for about one hour at constant temperature while stirring continuously. The substituted powdered mineral is then removed and is suitable for use in the invention PC.

The proportion of substituted mineral to organic resin in the polymer concrete or mortar will vary depending upon the degree of substitution of the mineral (which affects the degree to which the substituted mineral will expand); the specific volatile component used to replace the water of hydration (the increase in volume produced when these volatile compounds are released from the crystal varies from one compound to another); the inherent cure shrinkage of the particular monomer or resin used; and the degree of controlled expansion required in the particular application. The ratio of substituted mineral to organic resin may, therefore, range from about 1% to about 25%.

The preferred fillers of the instant invention are inorganic and range in composition and size depending upon the specific application. For example, if the PC is to be used in dental restorations, then a hard mineral filler such as crushed quartz, with a size range from about 0.1 to about 20 microns ($\mu$) may be used. In the restoration of delicate wooden antique artifacts, a soft mineral filler, such as clays, ranging in size from about 0.5 to about 5 microns may be used depending upon the size of the pores within the artifact. In applications such as the filling in of cracks or holes in concrete structures, larger fillers ranging in size from 0.01 to 0.8 inches may be appropriate.

EXAMPLE 1

Production of $NH_3$-MMT

A quantity of 100 grams of commercial MMT in the form of fine powder (1-4 micron particles) was placed in the flask 1, together with a magnetic stirring bar 7. The flask was closed with a rubber stopper 8 and connected to a vacuum source 4 by opening vacuum valve 9 with all other valves closed. The powder was gently stirred and warmed to a temperature of 40° C. under not more than 100 mmHg (absolute) pressure. When the temperature and pressure had stabilized at the above values, vacuum valve 9 was closed and $NH_3$ feed valve 10 opened, introducing gaseous $NH_3$ into the flask at a pressure of 635 mmHg (absolute) which was kept constant by the preset pressure regulator 11. The temperature was maintained constant for a minimum of one hour, then the system was allowed to cool gradually. The flask contents were stirred continuously throughout the entire process. When the flask reached ambient temperature, it was vented to the atmosphere by closing ammonia feed valve 10 and opening vent valve 12. The flask was then detached from the manifold and the $NH_3$-MMT powder was emptied into an open dish, where it was exposed to ambient air to remove excess ammonia. In a second experiment, the process of example 1 was followed with the exception that the flask and its contents were heated to 60° C., where the temperature was maintained for a minimum of one hour. The results of these two experiments are shown in Table I:

| Heating Temp. °C. | Water Lost (g/100 g MMT) | Ammonia Gained (g/100 g MMT) |
| --- | --- | --- |
| 40 | 0.175 | 4.897 |
| 60 | 1.112 | 5.035 |

EXAMPLE 2

Elimination of cure shrinkage in a dental restorative system with concomitant increase in strength An expandable polymer mortar was prepared from the resin composition shown. In the base system no $NH_3$-MMT was added while in cases 1 and 2, respectively, 1.0 and 1.8 wt% $NH_3$-MMT was added to the PC composition.

| Resin Composition | Weight % |
| --- | --- |
| 2,2-bis[4-(2 hydroxy-3-methacryloxy-propoxy) phenyl] propane; known as BIS-GMA | 75 |
| triethylene glycol dimethacrylate; known as TEGDMA. | 25 |

| Expandable PC Composition | Weight % | | |
| --- | --- | --- | --- |
| | Base | 1 | 2 |
| Resin | 21.50 | 21.50 | 21.50 |
| Initiator: Benzoyl peroxide | 0.25 | 0.25 | 0.25 |
| Promoter: dihydroxyethyl-p-toluidine | 0.08 | 0.08 | 0.08 |
| Silane coupling agent: 3 methacryloxy-propyl trimethoxysilane | 0.15 | 0.15 | 0.15 |
| Filler: crushed borosilicate glass: 1-20$\mu$ size | 78.02 | 77.02 | 76.22 |
| Cure-shrinkage Control Ingredient: $NH_3$/MMT | 0.00 | 1.00 | 1.80 |
| | 100.00 | 100.00 | 100.00 |

Specimen Size, Shape, and Curing Conditions

Cylindrical specimens 6 mm in diameter by 12 mm long of the above PC composition were molded in open plastic tubes and cured at 40° C. for 10 minutes. Peak exotherm was between 65° and 75° C. These specimens were tested to determine compressive strength according to ASTM-C116 Standard, and splitting tensile strength according to ASTM C-496. Flexural strengths were also obtained from bar-shaped specimens 4×4 mm in cross section by 25 mm long according to ASTM D-790 Standard.

Physical Properties of the Cured Systems

| Sample | Content of $NH_3/MMT$ (wt %) | Volume Change During Cure (%) | Compressive Strength: psi (% Increase From Base) | Flexural Strength: psi (% Increase From Base) | Tensile Strength: psi (% Increase From Base) |
|---|---|---|---|---|---|
| Base | 0 | −2.8 | 14,503 | 6,091 | 2,188 |
| 1 | 1.0 | −0.9 | 15,809 (+9%) | 6,761 (+11%) | 2,469 (+13%) |
| 2 | 1.8 | +0.1 | 16,678 (+15%) | 7,030 (+16%) | 2,605 (+19%) |

EXAMPLE 3

Low-viscosity, zero-cure-shrinkage acrylic cements for injection into cracks and crevices All specimens of the following compositions were prepared, molded as in Example 2, and cured at 25° C. (ambient) with a peak exotherm of about 75° C.

| Expandable PC Composition | Weight % | | | | |
|---|---|---|---|---|---|
| | Base | 1 | 2 | 3 | 4 |
| Methyl methacrylate (MMA) | 31.8 | 31.8 | 31.8 | 31.8 | 31.8 |
| triethylene glycol dimethacrylate | 30.0 | 30.0 | 30.0 | 30.0 | 30.0 |
| diethylene glycol dimethacrylate | 20.0 | 20.0 | 20.0 | 20.0 | 20.0 |
| Initiator: Benzoyl peroxide | 1.5 | 1.5 | 1.5 | 1.5 | 1.5 |
| Promoter: dimethyl-p-toluidine | 0.5 | 0.5 | 0.5 | 0.5 | 0.5 |
| Silane coupling agent: 3-methacryloxypropyl trimethoxysilane | 0.5 | 0.5 | 0.5 | 0.5 | 0.5 |
| colloidal silica | 2.0 | 2.0 | 2.0 | 2.0 | 2.0 |
| inert mineral filler (kaolinite) | 13.7 | 8.7 | 5.7 | 3.7 | 1.3 |
| Cure-Shrinkage Control | 0.0 | 5.0 | 8.0 | 10.0 | 12.0 |
| Ingredient: $NH_3/MMT$ | 100.0 | 100.0 | 100.0 | 100.0 | 100.0 |

Physical Properties of the Cured Systems

| Sample | Content of $NH_3/MMT$ (wt %) | Volume Change During Cure (%) | Compressive Strength (psi) (% Increase From Base) | Flexural Strength (psi) (% Increase From Base) |
|---|---|---|---|---|
| Base | 0 | −3.8 | 8,050 | 4,790 |
| 1 | 5 | −2.5 | 9,579 (+19%) | 5,412 (+13%) |
| 2 | 8 | −0.5 | 11,270 (+40%) | 5,748 (+20%) |
| 3 | 10 | +0.1 | 14,440 (+79%) | 6,087 (+27%) |
| 4 | 12 | −0.3 | 13,135 (+63%) | 5,939 (+24%) |

EXAMPLE 4

A polyester PC formulation with zero shrinkage and enhanced strength at ambient temperature cures

| Expandable PC Composition | Weight % | | | | |
|---|---|---|---|---|---|
| | Base | 1 | 2 | 3 | 4 |
| Resin: Dion Iso-6315 (Koppers Co., Pittsburgh, PA) | 14.55 | 14.55 | 14.55 | 14.55 | 14.55 |
| Initiator: Benzoyl peroxide | 0.22 | 0.22 | 0.22 | 0.22 | 0.22 |
| Promoter: dimethl-p-toluidine | 0.08 | 0.08 | 0.08 | 0.08 | 0.08 |
| Silane coupling agent: 3 methacryloxypropyl trimethoxysilane | 0.15 | 0.15 | 0.15 | 0.15 | 0.15 |
| Filler: silica sand, graded from 4 to 100 mesh according to ASTM C136 | 85.00 | 84.4 | 83.8 | 83.2 | 82.5 |
| Cure-shrinkage Control | 0.0 | 0.6 | 1.2 | 1.8 | 2.5 |
| Ingredient: $NH_3/MMT$ | 100.0 | 100.0 | 100.0 | 100.0 | 100.0 |

Specimen Size, Shape, and Curing Conditions

All specimens were cured in plastic molds at ambient temperature (25° C.) and atmospheric pressure. The peak exotherm ranged from 65°–75° C. For compressive and splitting tensile strength measurements, (ASTM C-116 and D-496, respectively) cylinders, ½″ in diameter × 1″ long were molded. For flexural strength measurements (ASTM D-790), plates ½″ thick × 6″ × 6″ were molded then cut into bars, ½″ × 1″ × 6″.

Physical Properties of the Cured PC Systems

| Sample | Content of $NH_3/MMT$ (wt %) | Volume Change During Cure (%) | Compressive Strength: psi (% Increase From Base) | Flexural Strength: psi (% Increase From Base) | Tensile Strength: psi (% Increase From Base) |
|---|---|---|---|---|---|
| Base | 0 | −2.9 | 9,600 | 3,625 | 1,680 |
| 1 | 0.6 | −1.8 | 10,272 (+7%) | 4,060 (+12%) | 1,764 (+5%) |
| 2 | 1.2 | −0.8 | 11,080 (+15%) | 4,422 (+21%) | 1,814 (+8%) |
| 3 | 1.8 | +0.1 | 11,328 (+18%) | 4,676 (+28%) | 1,881 (+12%) |
| 4 | 2.5 | −0.3 | 11,145 (+16%) | 4,503 (+24%) | 1,847 (+10%) |

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

I claim:

1. A process for the production of a polymer concrete composition of controllable cure shrinkage, comprising:
    (a) dispersing a substituted mineral additive, produced by the substitution of at least part of the water of hydration of said mineral additive with a composition of higher volatility than water, into a polymerizable resin composition in a quantity sufficient to achieve the desired cure shrinkage control in the mixture when the mixture solidifies;

(b) mixing particulate inorganic, filler with the resin composition containing the substituted mineral additive in an amount sufficient to obtain a raw polymer concrete or mortar of the desired consistency;

(c) curing the resin/additive/filler mixture at a temperature sufficient to cause said substituted mineral additive to expand as the resin polymerizes allowing the curing mixture to solidify.

2. The process of claim 1, further comprising before said dispersing step, the steps of:

(a) removing at least part of the water of hydration of a hydrated mineral additive; and (b) contacting the at least partially dehydrated mineral additive with a composition of higher volatility than water so as to substitute said volatile composition for the removed water of hydration in the mineral additive structure to produce a substituted mineral additive.

3. The process of claim 2, wherein said removing step includes removing the water of hydration by applying heat.

4. The process of claim 2, wherein said removing step includes removing by subjecting the hydrated mineral additive to evacuation.

5. The process of claim 2, wherein said contacting step includes contacting with a vapor form of the composition of volatility higher than water.

6. The process of claim 2, wherein said contacting step includes contacting with a liquid form of the composition of volatility higher than water.

7. The process of claim 2, wherein said step of contacting with a composition of higher volatility than water includes contacting with a composition selected from the group consisting of ammonia, methylamine, methylethylamine, dimethylamine, diethylamine, methanol, and acetone.

8. The process of claim 2, wherein said removing includes at least partially removing water of hydration from a hydrated mineral containing from about 10 wt% to about 25 wt% water of hydration.

9. The process of claim 2, wherein said removing includes at least partially removing the water of hydration from a hydrated mineral additive selected from the group consisting of montmorillonite, beidellite, montronite, saponite and hectorite.

10. The process of claim 1, wherein said dispersing step includes incorporating the substituted mineral additive into a liquid resin composition by rapid mechanical agitation.

11. The process of claim 1, wherein said dispersing step includes incorporating the substituted mineral additive into a fluidized resin composition by mechanical milling.

12. The process of claim 1, wherein said curing step includes curing at ambient temperatures.

13. The process of claim 1, wherein said curing step includes curing at a temperature from about 30° C. up to about 100° C.

14. The process of claim 1, wherein said mixing includes mixing a raw polymer concrete or mortar wherein the proportion of substituted mineral to resin is from about 1 to about 25 wt.%.

15. The process of claim 1, wherein said curing includes curing a mixture wherein said mineral expansion is sufficient to produce zero shrinkage of the cured mixture as compared to the volume of the precured mixture.

16. The process of claim 1, wherein said curing includes curing a mixture wherein said mineral expansion is sufficient to produce a net expansion in the total volume of the cured mixture as compared with the precured mixture.

17. The process of claim 1, further comprising adding a coupling agent effective for binding the mineral additive to the resin.

18. The process of claim 17, wherein said adding includes adding a coupling agent selected from the group consisting of organo-silanes, titanates, and zirconates.

19. The process of claim 18, wherein said adding of an organo-silane coupling agent includes adding 3 methacryloxypropyl trimethoxysilane.

20. The process of claim 17, wherein said adding of a titanate coupling agent includes adding a coupling agent selected from the alkoxy, chelated, quanternary and coordinated titanates.

* * * * *